Jan. 18, 1944. W. A. RAY 2,339,353
FLUID CONTROL VALVE
Filed June 16, 1942 2 Sheets-Sheet 1

Fig. 1

Inventor,
WILLIAM A. RAY
By John H. Rouse,
Attorney

Jan. 18, 1944.    W. A. RAY    2,339,353
FLUID CONTROL VALVE
Filed June 16, 1942    2 Sheets-Sheet 2
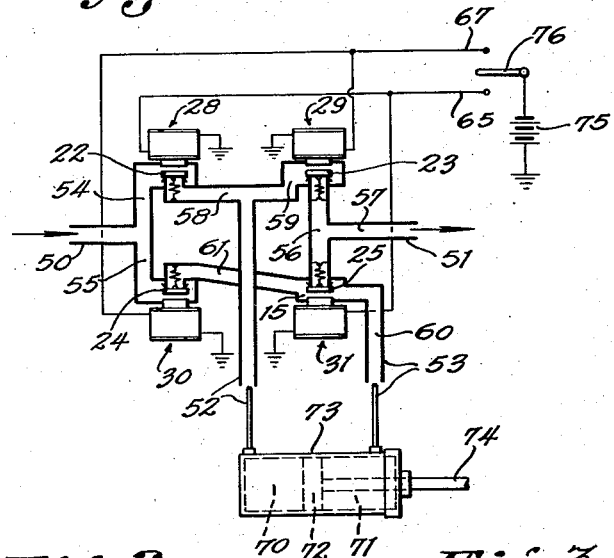
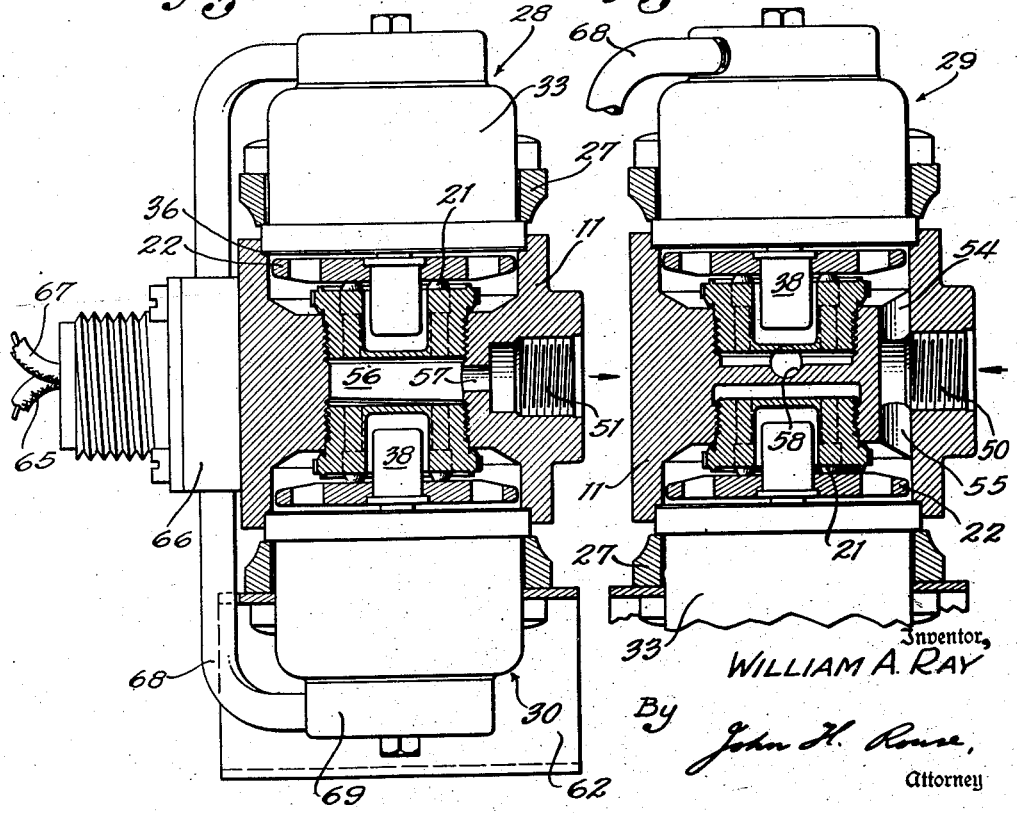
Inventor,
WILLIAM A. RAY
By
John H. Rouse,
Attorney Patented Jan. 18, 1944

2,339,353

UNITED STATES PATENT OFFICE 2,339,353

FLUID CONTROL VALVE

William A. Ray, Los Angeles, Calif.

Application June 16, 1942, Serial No. 447,228

3 Claims. (Cl. 137—144)

My present invention relates to fluid control valves of the multiple type wherein independent operating means are provided for each closure member. An object of the invention is the provision of a multiple valve of the type indicated which is compactly arranged and wherein the weight factor per valve unit is low, such being an important consideration particularly when the valve is employed in an airplane.

In my copending applications, Serial No. 342,493, filed June 26, 1940, and Serial No. 429,983, filed February 9, 1942, there are disclosed examples of electromagnetically operated fluid control valves having disk-shaped closure members which, being constructed wholly or in part of magnetic material, also serve as armatures attractable toward the pole face of the electromagnet for operation of the valve. The general construction disclosed in those applications has certain advantages such as, when the armature-closure-member is positioned close to the electromagnet, the capability of operating against high fluid pressure, and, as is particularly pointed out in another of my copending applications, Serial No. 429,778, filed February 6, 1942, the ability to withstand the effect of vibration (such as that to which a valve is subjected in an airplane) tending when the valve is closed to effect wear-producing relative movement of the closure member and its seat. It is therefore a further object of this invention to apply the principles of such construction to a multiple valve so as to provide a compact light-weight structure wherein the advantages of the single-valve construction are preserved.

Another object of the invention is the provision of a four-way valve structure embodying the construction described above and wherein one pair of valve-operating means is mounted on one side of a base member and another pair on its opposite side, such arrangement having been found by me to afford a low ratio of weight per valve unit.

Other objects and advantages of the invention will be found in the description, the drawings and the appended claims; and for complete understanding of the invention reference may be had to the following detailed description and accompanying drawings wherein:

Figure 1 is a view, mainly in longitudinal section, of a valve embodying my invention;

Figures 2 and 3 are transverse sections taken along the lines 2—2 and 3—3, respectively, of Fig. 1; and Figure 4 is a diagram illustrating the application of the valve, shown in the other figures, to the control of a fluid pressure motor.

In the drawings, the numeral 11 indicates a base member or casting of generally rectangular shape and having in its top and in its bottom surface a pair of laterally-spaced cylindrical recesses 12, 13 and 14, 15. The bottom wall of each of these recesses is centrally bored and threaded to receive valve-port members 16, 17, 18 and 19, respectively. The four port members are identical in construction and each has three equally-spaced port passages 20, in the outer end of each of which is secured a bushing 21 which provides at its extremity a substantially knife-edged annular valve seat, the seats being ground and lapped after assembly so that they terminate in a plane. In the outer ends of the recesses 12—15 are disk-shaped closure members 22, 23, 24 and 25, respectively. These members are of magnetic material and their undersides are ground and lapped to provide plane surfaces cooperable with the sets of seats. The closure members are a relatively loose fit in the respective recesses and thus can tilt in their movements toward and away from the seats. To limit the degree of such tilt to a minute angle upon initial engagement with or final disengagement from the seats and thus prevent their uneven wear, a portion of the surface of each port member toward its periphery and surrounding the set of seats is raised to form an annular "guard-ring" 26 spaced below the plane of the seats by a distance of the order of 0.001 inch. This feature is the subject of another of my copending applications, Serial No. 418,707, filed November 12, 1941.

Closing the outer ends of each of the recesses 12—15, and fitting within shallow enlargements thereof, are electromagnets 28, 29, 30 and 31, respectively, which are clamped in position by rings 27 secured to the base member by screws 32. The electromagnets are identical in construction and each comprises an inverted cup-shaped outer core 33 and an inner cylindrical core 34, there being an energizing coil winding 35 in the annular space between the cores. The core ends form pole faces parallel to and spaced but a short distance from the outer surfaces of the armature-closure-members 22—25. For sealing the interior of the electromagnet from the fluid controlled by the valve, and also for preventing magnetic "sticking" of the armature to the pole faces, a thin disk 36 of non-magnetic material is provided below the pole faces, this disk being backed, or supported, across the coil-winding space by a relatively thick non-magnetic washer 37 which rests on shoulders formed on the sides of the cores adjacent the faces thereof. The armature-closure-member is centrally apertured to receive and hold a shell 38 which extends freely into a recess formed in the outer surface of the port member. Within this shell is a compression spring 39 carrying at its outer end a headed pin 40 which bears against the electromagnet and thus biases the armature-closure-member toward its seat; and to prevent dash-pot action of this member in its movements, it is provided toward its periphery with a plurality of openings 41.

The valve illustrated in the drawings being of the four-way type, the base 11 is provided with four fluid connections: a main inlet 50 (Fig. 3), a main outlet 51 (Fig. 2), and a pair of connections 52 and 53 (Fig. 1) through which the fluid may pass in either direction (as indicated by the arrows) depending upon which closure members are operated. The inlet 50 communicates by way of a pair of vertical passages 54 and 55 (Fig. 3) with the recesses 12 and 14, respectively, this condition being indicated in Fig. 1 by the arrows extending from the bottoms of these recesses. The central bores of the other two recesses 13 and 15 are joined to form a main outlet chamber 56 between the port members 17 and 19, from which chamber a short horizontal passage 57 leads to the outlet 51 (Fig. 2). Extending horizontally from the connection 52 is a passage 58 which intersects the lower end of the bore in which port member 16 is threaded and connects with a vertical passage 59 leading to the recess 13. The other connection 53 is connected by a vertical passage 60 with the recess 15, an inclined passage 61 connecting this recess with the otherwise-closed inner end of the bore in which port member 18 is threaded.

The valve structure is provided with a mounting bracket 62 of sheet metal. A pair of leads 63 is brought out from each of the electromagnet coils through an opening in the end wall of the cup-shaped core, one of each pair of leads being grounded to the core as indicated at 64. The ungrounded coil leads of the diagonally opposite (as viewed in Fig. 1) pair of electromagnets 28 and 31 are joined together and extended at 65 (Fig. 2) through a fitting 66 secured to the front of the base member. Likewise, a common lead 67 is brought out from the coils of the other pair of electromagnets 29 and 30. These leads are carried between the several electromagnets and the terminal fitting 66 in protective metal pipes 68 which extend from caps 69 mounted on the outer end of each of the electromagnets.

The four-way valve described above is diagrammatically illustrated in Fig. 4 wherein the parts have been assigned the same numerals as those of the corresponding parts of the valve structure. The fluid control connections 52 and 53 of the valve are shown extended to communicate with pressure chambers 70 and 71, respectively, formed on opposite sides of a piston 72 working in a cylinder 73; the piston having a stem 74 for connection to a device to be actuated. It is to be assumed that a source of fluid under pressure is connected to the valve main inlet 50 and that the outlet or exhaust connection 51 is returned to the fluid reservoir if liquid fluid is employed. A source of electrical energy, indicated at 75, is arranged to be switched by an arm 76 through the lead 65 to the electromagnets 28 and 31 in parallel, or through lead 67 to the other diagonally opposite pair of electromagnets 29 and 30; the return paths for the energy being through the grounds indicated. If electromagnets 28 and 31 are energized and their respective armature-closure-members 22 and 25 thus attracted to open position, fluid passes from the inlet 50 through passages 54, 58 and connection 52 to the motor chamber 70; the fluid in the other motor chamber 71 exhausting through the connection 53, passage 60, chamber 56 and passage 57 to the outlet 51; the piston thus being moved in a right-hand direction. If the switch arm 76 is only momentarily closed and then returned to its neutral position, as illustrated, the movement of the piston is checked before it reaches the limit of its stroke, the piston then remaining in its new position since all the closure members are seated. If the switch arm is now moved downward to energize the other pair of electromagnets 29 and 30, closure members 23 and 24 being open the pressure fluid can pass from the inlet 50 through passages 55, 61, recess 15, passage 60 and connection 53 to the chamber 71; the fluid in chamber 70 now exhausting through the connection 52, passages 58, 59, chamber 56 and passage 57 to the outlet 51; the piston now moving in a left-hand direction.

While I have herein shown and described a specific embodiment of my invention, I wish it to be understood that modifications may be made without departing from the spirit of the invention and that I intend therefore to be limited only by the scope of the appended claims.

I claim as my invention:

1. In a four-way fluid control valve; a base member having a first pair of laterally-spaced recesses in one side surface thereof and a second pair of laterally-spaced recesses in its opposite side surface, the individual recesses of one of the pairs being substantially coaxial with those of the other pair; an outwardly-faced valve seat in each of said recesses; a disk-shaped closure member in each of the recesses and independently cooperable with said seats, said closure members being wholly or in part of magnetic material; and an electromagnet closing the outer end of each of the recesses for independently operating the closure members; said base member having a main inlet opening and a main outlet opening, a first passage connecting the area at the outer side of a given axially-aligned two of the seats with said inlet opening, a second passage connecting the area at the inner side of the remaining axially-aligned two of the seats with said outlet opening, a third passage connecting the area at the outer side of one of said given two of the seats with the area at the inner side of one of said remaining two of the seats, a fourth passage connecting the area at the outer side of the other of said given two of the seats with the area at the inner side of the other of said remaining two of the seats, and a pair of additional passages respectively connecting said third and said fourth passages with the exterior of the base member.

2. In a fluid control valve: a base member having a bore terminating at opposite sides thereof, the outer end portions of said bore being enlarged, means in unenlarged portions of the bore forming a pair of opposed outwardly-faced valve seats, a disk-shaped closure member disposed in each of said enlarged end portions of the bore and independently cooperable with said seats, said closure member being wholly or in part of magnetic material, and a pair of electromagnets sealingly closing the respective outer ends of the bore for independently operating the closure members.

3. In a fluid control valve: a base member having a first pair of laterally-spaced recesses in one side surface thereof and a second pair of laterally-spaced recesses in its opposite side surface, the individual recesses of one of the pairs being coaxial with those of the other of the pairs, the outer end portion of each of said recesses being enlarged, an outwardly-faced valve seat in the unenlarged portion of each of the recesses, a disk-like closure member in said enlarged end portion of each of the recesses and independently cooperable with said seats, said closure members being wholly or in part of magnetic material, and an electromagnet sealingly closing the outer end of each of the recesses for independently operating the closure members, said base member having inlet and outlet openings as well as passages connecting the areas adjacent each of the valve seats respectively with at least one of said openings.

WILLIAM A. RAY.